(12) United States Patent
McGuinness (10) Patent No.: US 12,359,611 B1
(45) Date of Patent: Jul. 15, 2025

(54) HYDROTHERMAL TREATMENT

(71) Applicant: Thomas George McGuinness, Green Cove Springs, FL (US)

(72) Inventor: Thomas George McGuinness, Green Cove Springs, FL (US)

( * ) Notice: Subject to any disclaimer, the term of this patent is extended or adjusted under 35 U.S.C. 154(b) by 0 days.

(21) Appl. No.: 18/816,753

(22) Filed: Aug. 27, 2024

Related U.S. Application Data (60) Provisional application No. 63/581,298, filed on Sep. 8, 2023, provisional application No. 63/579,879, filed on Aug. 31, 2023.

(51) Int. Cl.
| | |
|---|---|
| *F02C 1/05* | (2006.01) |
| *F22B 1/26* | (2006.01) |
| *F23D 99/00* | (2010.01) |
| *F23G 7/06* | (2006.01) |

(52) U.S. Cl.
CPC ............... *F02C 1/05* (2013.01); *F22B 1/265* (2013.01); *F23D 91/04* (2015.07); *F23G 7/066* (2013.01); *F23G 2206/203* (2013.01)

(58) Field of Classification Search
CPC ...... C02F 1/72; C02F 1/70; C02F 1/36; C02F 1/32; C02F 1/30; C02F 1/46; C02F 1/74; C02F 1/00
See application file for complete search history.

(56) References Cited

U.S. PATENT DOCUMENTS

| | | | |
|---|---|---|---|
| 5,384,051 A  * | 1/1995 | McGinness | ............. C02F 1/008 210/765 |
| 5,558,783 A | 9/1996 | McGuinness | |

* cited by examiner

*Primary Examiner* — Youngsul Jeong
(74) *Attorney, Agent, or Firm* — MP Patents, LLC (57) ABSTRACT

A reactor system includes a pressure vessel having a vessel wall, a feed port at a superior end of the pressure vessel, a permeable liner disposed within the pressure vessel and at least one hydrothermal jet mounted to the pressure vessel. The feed port is configured for feeding a liquid target reactant stream into the pressure vessel. The permeable liner separates the pressure vessel into an internal reaction zone and an outer annular chamber. The hydrothermal jet is mounted external to the reaction zone and is configured to add heated mixture of carrier and oxidizer to the internal reaction zone. A dividing wall portions the outer annular chamber into a cooling zone and an exhaust zone through which by-products of the reaction exit from the reaction zone.

11 Claims, 5 Drawing Sheets

HYDROTHERMAL TREATMENT

CROSS-REFERENCE TO RELATED APPLICATIONS

The disclosure claims the benefit of and incorporates herein by reference in their entirety, U.S. Provisional Application No. 63/579,879 filed 31 Aug. 2023 and entitled 'OXIDATION REACTION', and U.S. Provisional Application No. 63/581,298 filed 8 Sep. 2023 and entitled 'HYDROTHERMAL TREATMENT'.

SUMMARY

The disclosure also describes a hydrothermal reactor system. The second reactor system includes a pressure vessel having a vessel wall, a feed port at a superior end of the pressure vessel, a permeable liner disposed within the pressure vessel and at least one hydrothermal jet mounted to the pressure vessel. The feed port is configured for feeding a liquid target reactant stream into the pressure vessel. The permeable liner separates the pressure vessel into an internal reaction zone and an outer annular chamber. The at least one hydrothermal jet is mounted external to the internal reaction zone and is configured to vaporize the liquid target reactant and deliver oxidizer to the internal reaction zone. A dividing wall portions the outer annular chamber into a cooling or bathing zone and an exhaust zone through which by-products of the reaction exit from the reaction zone.

The disclosure also describes a hydrothermal treatment process. A supply of water, a supply of at least one auxiliary fuel, a supply of at least one oxidizer and a supply of at least one carrier and a pressure vessel having a vessel wall are provided. A permeable liner is disposed within the pressure vessel to separate the pressure vessel into an internal reaction zone and an outer annular chamber. Water from the supply thereof is fed into the pressure vessel at a first location. A mixture of heated carrier supplied from the supply of the at least one carrier, heated oxidizer supplied from the supply of the at least one oxidizer and exhaust produced by combustion of auxiliary fuel supplied from the supply of auxiliary fuel is provided to the internal reaction zone at a second location.

Further, the disclosure describes a hydrothermal reactor system. The hydrothermal reactor system includes a supply of carrier provided at a supercritical temperature and pressure, a pressure vessel, a jet, a first heat exchanger, a second heat exchanger and a third heat exchanger, a 2-phase separator, a valve, an expansion engine and an advanced power recovery unit. The pressure vessel includes, configured to contain a reaction between a reactant and an oxidizer, a reaction zone defined by a vessel wall. At least one inlet of the pressure vessel is in fluid communication with the reaction zone for input of a reactant feed. An outlet of the pressure vessel is in fluid communication with the reaction zone for output of reaction products. The jet is mounted external to the vessel wall and configured to supply heat to the reaction zone with a mixture of carrier, oxidizer and exhaust produced by combustion of auxiliary fuel and oxidizer in a combustion chamber of the jet. The first heat exchanger is configured to heat a supply of oxidizer with the reaction products output from the pressure vessel outlet. The second heat exchanger is configured to heat the supply of carrier. The third heat exchanger is configured to heat the supply water. The 2-phase separator is configured to separate liquid and vapor phases of the reaction products output from the pressure vessel outlet upstream of the first heat exchanger. The first heat exchanger is further configured to heat the supply of pressurized oxidizer with liquid phase reaction products from the 2-phase separator. The valve is located in a vapor outlet of the separator and is configured to set reaction operation pressure. The expansion engine is configured to recover energy from vapor phase reaction products output from the pressure vessel outlet. The advanced power recovery unit is configured to harvest mechanical power from liquid phase reaction products output by the pressure vessel outlet.

Further still, the disclosure describes a power generation process. The power generation process includes providing a supply of water, a supply of at least one auxiliary fuel, a supply of at least one oxidizer and a supply of at least one carrier at supercritical temperature and pressure and a pressure vessel having a pressure vessel wall. Heat is supplied internal to the vessel wall with a mixture of the at least one carrier, the at least one oxidizer and exhaust produced by combustion of the at least one auxiliary fuel and the at least one oxidizer. Mechanical power is harvested from effluent output by one or more outlets of the pressure vessel. Pressure in the pressure vessel is reduced to sub-critical with a backpressure control valve. The supplies of water, oxidizer and the at least one carrier are heated with effluent output from the pressure vessel.

BRIEF DESCRIPTION OF THE FIGURES

The summary above, as well as the following detailed description of illustrative embodiments, is better understood when read in conjunction with the appended drawings. For the purpose of illustrating the present disclosure, example constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein.

DETAILED DESCRIPTION

The following detailed description illustrates embodiments of the present disclosure and manners by which they can be implemented. Although the best mode of carrying out the present disclosure has been disclosed, those skilled in the art would recognize that other embodiments for carrying out or practicing the present disclosure are also possible.

It should be noted that the terms "first", "second", and the like, herein do not denote any order, quantity, or importance, but rather are used to distinguish one element from another. Further, the terms "a" and "an" herein do not denote a limitation of quantity, but rather denote the presence of at least one of the referenced item.

Many means of waste disposal rely on moving the waste from higher risk environments to lower risk environments, on neutralizing hazardous characteristics or otherwise reducing hazards associated with the waste. A need exists for a completely thorough means of disposing of hazardous waste such as Per- and polyfluoroalkyl substances (PFAS), Perfluorooctanesulfonic acid (PFOS) and related compounds both with and without carbon including but not limited to organofluorides. Combustion of fuels and wastes using accelerated oxidation minimizes unreduced exhaust. One form of combustion, supercritical water oxidation (SCWO), is suitable for the destruction of both long and short chain perfluoroalkyl substances, requires only short residence times and enables energy recovery.

Embodiments of the disclosure provide hydrothermal treatment reactors and/or hydrothermal reactor systems and hydrothermal treatment processes including supercritical water oxidation reactors, systems and processes which substantially eliminate, or at least partially address, problems in the prior art, enabling more complete disposal of certain types of oxidizable or target waste or reactant components under more stable reaction conditions, with variable pressure operation, venting of undesirable vapor space formation in an annulus of the pressure vessel, preheating of vapor exhaust, improved system heat balance and annular space cooling.

A hydrothermal oxidation reactor system includes a pressure vessel having a vessel wall, a feed port at a superior end of the pressure vessel, a permeable liner disposed within the pressure vessel and at least one hydrothermal jet mounted to the pressure vessel. The pressure vessel is configured for operation at temperatures above the critical temperature of water and at pressures either in excess of or below the critical pressure of water. Hydrothermal oxidation may occur at any reactor operating pressure above or below the critical pressure of water. The reactor feed port is configured for feeding a waste stream, a target reactant stream or water into the pressure vessel. The permeable liner separates the pressure vessel into an internal reaction zone and an outer annular chamber. The hydrothermal jet is mounted external to the reaction zone and is configured to add a heated mixture of carrier, oxidizer, and byproducts of combustion to the internal reaction zone. By using such hydrothermal jets, the radiant heat transfer load on the inner surface of the permeable liner can be reduced, helping maintain liner "wetness" at all locations. A dividing wall portions the outer annular chamber into a transpiration cooling zone and a quench cooling exhaust zone through which by-products of the reaction exit from the reaction zone and enter a 2-phase gas-liquid separator.

Heat of reaction produced in the reactor is efficiently transferred to the incoming reactor feed streams by means of heat exchangers by means of a recirculated flow of hot pressurized liquid carrier from the 2-phase separator. Useful power is recovered from the hot, pressurized vapor effluent of said separator by means of a gas expansion engine generator. Useful power is recovered from the hot, pressurized, recirculating liquid effluent from said separator by means of an organic Rankine cycle, Kalina cycle, or other suitable power recovery method. Alternatively, the heat from the pressurized liquid effluent may be recovered for process heating, municipal district heating, or other such non-power generating purpose. Though most of the reactor system is capable of operating at pressures below the critical pressure of water, the supercritical steam generator always operates above the critical pressure of water. Reactor pressure can be adjusted online to selectively operate either above or below the critical pressure of water. The reactor system may alternatively be operated in pure power generation mode.

Additional aspects, advantages, features and objects of the disclosure will be made apparent from the drawings and the detailed description of the illustrative embodiments construed in conjunction with the appended claims that follow.

It will be appreciated that features of the disclosure are susceptible to being combined in various combinations without departing from the scope of the disclosure as defined by the appended claims.

Supercritical oxidation permits highly efficient combustion of oxidizable materials including but not limited to fossil fuels, renewable organic feedstocks, hydrolysate of toxic and energetic compounds and gaseous feedstocks, hereinafter referred to as "wastes" for the sake of simplicity. Further, supercritical oxidation thoroughly and safely eliminates or neutralizes these wastes. An oxidation reaction elevated to supercritical oxidation conditions is capable of destroying such wastes with high conversion efficiency at an accelerated reaction rate.

Figure 1:
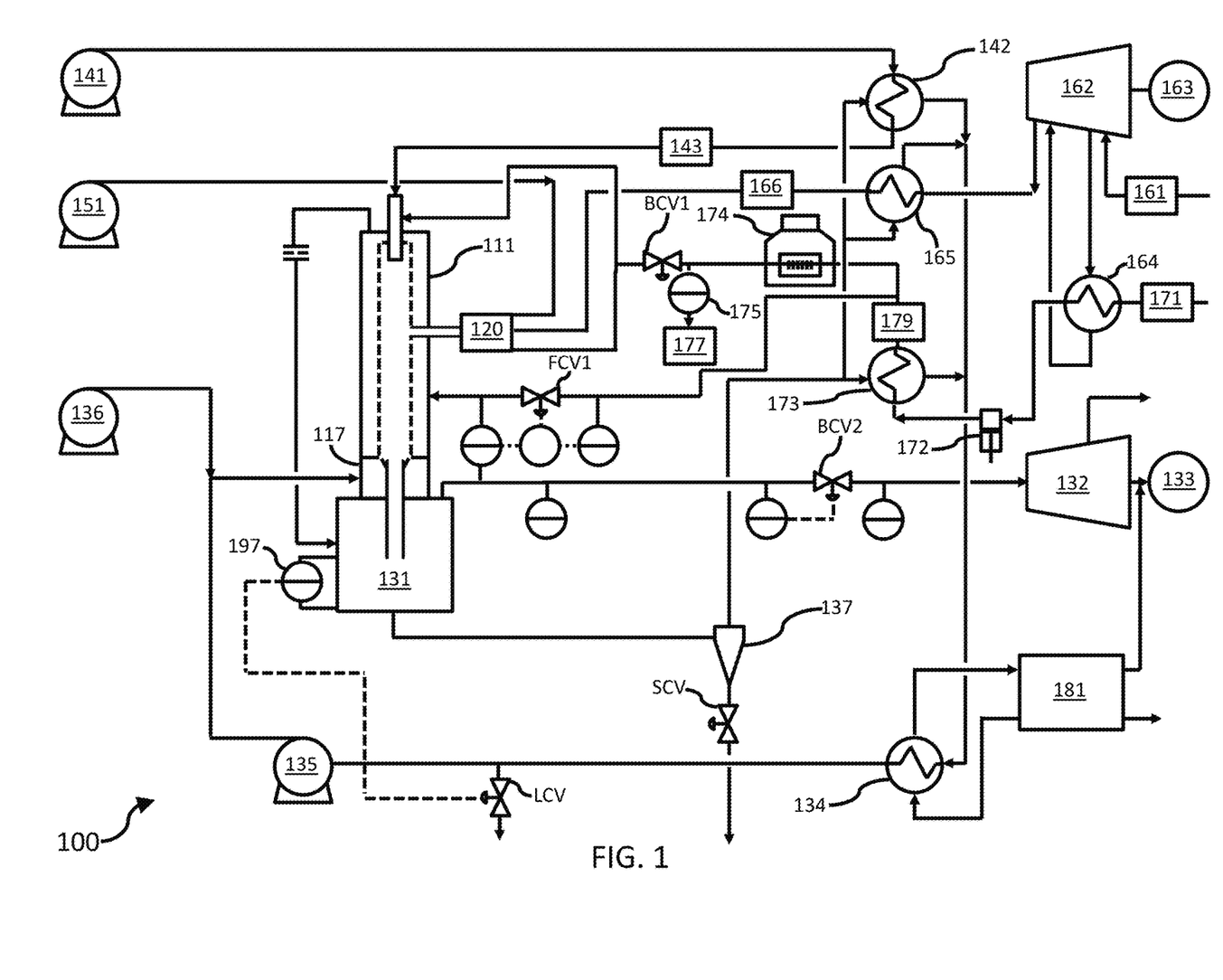
FIG. 1 schematically illustrates an example hydrothermal treatment reactor system.

FIG. 1 illustrates a process flow diagram for an example reactor system 100. Reactor system 100 includes a supply of liquid waste or target reactant 141, an auxiliary supply of fuel 151, a supply of at least one oxidant or oxidizer 162, a supply of at least one carrier 171, a pressure vessel 111, means for injecting heated and compressed oxidizer into the pressure vessel and a number of other components suitable for enabling various thermodynamic processes described in further detail below.

Any of a variety of auxiliary fuels may be suitable for use in association with disclosed reactors and reactor systems including but not limited to natural gas, methane, butane, propane, ethanol, diesel fuel or a combination of these. Any of a variety of oxidizers may be suitable for use in association with disclosed reactors and reactor systems including but not limited to oxygen and/or filtered air. Any of a variety of carriers may be suitable for use in association with disclosed reactors and reactor systems including but not limited to various liquids, gasses and/or fluids such as water. In an example, when used as a carrier, water may be deionized or chemically treated to control fouling and is provided to pressure vessel and/or a reaction zone 114 at supercritical temperature.

Figure 2:
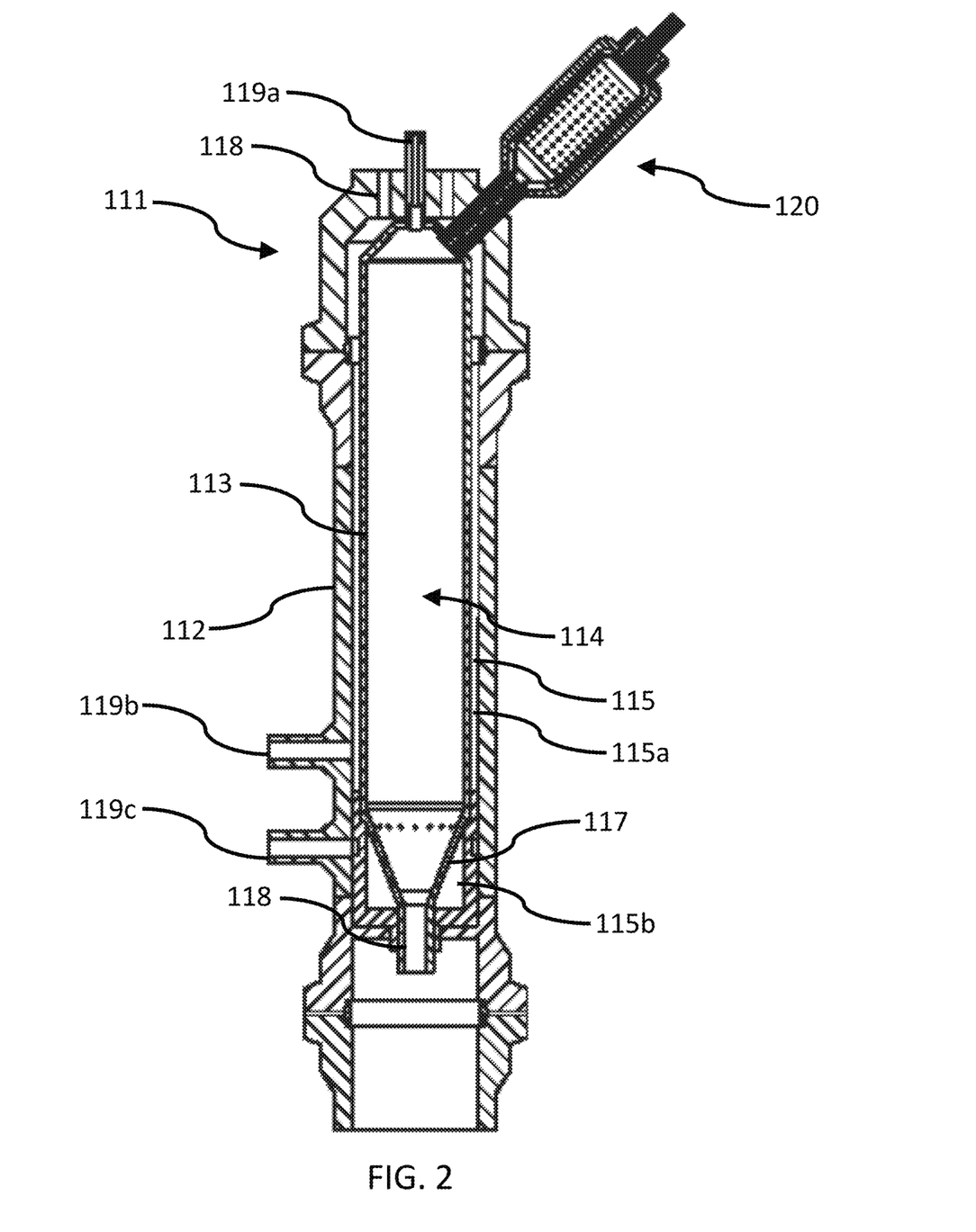
FIG. 2 illustrates a cross-sectional view of an example hydrothermal treatment pressure vessel suitable for use in association with disclosed hydrothermal treatment reactor systems.

Referring to FIG. 2, pressure vessel 111 includes a vessel outer wall 112 and a liner 113 dividing inner spaces of the pressure vessel. Pressure vessel 111 is configured for operation at high temperature and pressure. Pressure vessel 111 is configured for operation at temperatures in excess of the critical temperature and pressures below or in excess of the critical pressure of water. Water may be a suitable carrier for some oxidizers and or target reactant feed that may be reacted in pressure vessel 111 and, in such applications, pressure vessel 111 is configured for operation at temperatures in excess of the critical temperature and pressures in excess of or below the critical pressure of water. Pressure vessel 111 may, nevertheless, be suitable for operation at a variety of pressures including critical and subcritical.

Pressure vessel 111 may be constructed from any of a variety of materials exhibiting corrosion-resistance and high-strength at high temperatures. Example materials include but are not limited to stainless steel, chrome-nickel alloys, carbon steel, titanium alloys, aluminum alloys or combinations of these. Other example materials include inexpensive alloys with corrosion-resistant weld overlays such as titanium, Hastelloy 276, Iconel 624 of combinations of these on internal wetted surfaces. Pressure vessel 111 may take any of a variety of shapes including but not limited to a closed right cylinder.

Tubular reactors are prone to creating excessive temperatures within the reaction zone due to the formation of hydrothermal "flames" which can exceed the maximum allowable temperature strength for the tubing alloy. For example, the tensile strength of the alloys tubular reactors are commonly manufactured from, eg. Inconel 625, declines steeply at temperatures above 1200° F. This represents a potential safety hazard due to tube rupture and loss of containment.

A permeable liner 113 is disposed within pressure vessel 111 between the means for injecting and reaction zone 114, in part, to prevent impingement of hydrothermal flames on pressure vessel outer wall 112 and flushing away any solids, salts or corrosive reaction byproducts in close proximity to the liner inner surface. Permeable liner 113 separates pressure vessel 111 into an internal reaction zone 114, where the target reactant feed and oxidizer react, and an outer annular space or chamber 115 configured for filling with a carrier and/or oxidizer cooler than the liner. Permeable liner 113 serves to distribute transpiration water over the inner surface of the liner. This transpiration water mixes with and partially cools the reaction byproducts upstream of the exit of permeable liner 113.

Permeable liner 113 may take any of a variety of forms suitable for preventing impingement of hydrothermal flames on pressure vessel outer wall 112, stabilizing flow of a mixed target reactant stream and/or preventing reaction quenching including but not limited to a hollow cylindrical shape, a hollow conical shape, a hollow frustum shape, a parallelepiped or a combination of these. In an example, liner 113 is concentric with and/or shares a common longitudinal or vertical axis with pressure vessel 111.

The permeability of liner 113 may vary along its length or height. For example, the permeability of liner 113 is higher near the top or superior end or at the bottom or inferior end thereof to promote rinsing surfaces of that part of the liner with oxidizer and/or carrier from annular chamber 115 to reduce, if not eliminate, fouling, scaling and/or clogging. Permeability of liner 113 may be higher near the inlet end to provide increased liner cooling at locations of higher reaction temperature and heat release rates.

Permeable liner 113 may be of a segmented construction along it's longitudinal axis and/or along the length of pressure vessel 111 such that discrete lengths of the liner are joined by overlapping slip joints. Thickness, permeability and/or metallurgy of the segments may be varied in accordance with the anticipated conditions at those locations in pressure vessel 111 and/or reaction zone 114.

Any of a variety of corrosion resistant materials may be suitable for the construction of permeable liner 113 including but not limited to ceramics or ceramic-coated metals. Example ceramic materials include yttria-stabilized zirconia or alumina. Example metallic materials include perforated of porous alloy sheet manufactures from titanium, Inconel 625 or Hastelloy C-276.

A dividing wall 116 portions outer, annular chamber 115 into upper 115a and lower 115b chambers. Upper chamber 115a is configured to convey pre-heated transpiration coolant and lower chamber 115b is configured for conveying a coolant medium to quench reactions and flush any free solids exiting reaction zone 114. Exhaust funnel 117 at an inferior or bottom end of permeable liner 113 may be permeable to fluid passed from lower chamber 115B. Cooled exhaust products and/or effluent of the reaction exit from reaction zone 114 through an exhaust zone internal to exhaust funnel 117.

Coupled with the supply of target reactant, reactor feed port 119a penetrates pressure vessel 111 and is configured for feeding a target reactant stream thereto, for example, at a superior end of the pressure vessel. Transpirational carrier feed port 119b is configured to deliver carrier to upper annular chamber 115a while quench cooling feed port 119c is configured to deliver cooled liquid effluent to lower annular chamber 115b for cooling of the reaction byproducts by way of permeable exhaust funnel 117.

In some conditions, a vapor space can form at the superior or top end of annular chamber 115 internal to pressure vessel outer wall 112. A vapor outlet or vent 118 may penetrate vessel outer wall 112 at a top or superior of annular chamber 115 to vent accumulated vapor therefrom either to internal reaction zone 114 or to a 2-phase separator 131. This enables keeping annular chamber 115 full of carrier at all times. In an example, vent 118 includes a flow control orifice. In another example, vent 118 includes a flow control valve.

The means for injecting may include one or more hydrothermal jets 120 coupled with the supplies of carrier, oxidizer and auxiliary fuel. A hydrothermal jet 120 is configured to combust a mixture of carrier, oxidizer and auxiliary fuel and expel resulting oxidizer-rich exhaust into reaction zone 114, to preheat the reaction zone to operating temperature, to vaporize the liquid target reactant feed in the reaction zone and/or to ignite a reaction within the reaction zone.

A hydrothermal jet 120 may be mounted external to reaction zone 114 so as to be aerodynamically isolated from target reactant being fed into pressure vessel 111 preventing disturbance of a combustion zone of the hydrothermal jet by any variable-composition feed entering at feed port 119a. A hydrothermal jet 120 may also be remote from an outer diameter of pressure vessel 111 as the physical size of the hydrothermal jet may preclude locating it internal to, or as an integral part of pressure vessel 111. Exhaust from the combustion of the carrier, oxidizer and auxiliary fuel is expelled remote from pressure vessel outer wall 112 at an exit flow velocity adequate to penetrate internal reaction zone 114 and promote mixing with the target reactant feed and/or the carrier and/or the oxidizer in the internal reaction zone. While only a single hydrothermal jet is depicted in FIGS. 1 & 2, any suitable number of hydrothermal jets may be included for supporting reactions in reaction zone 114.

Figure 3:
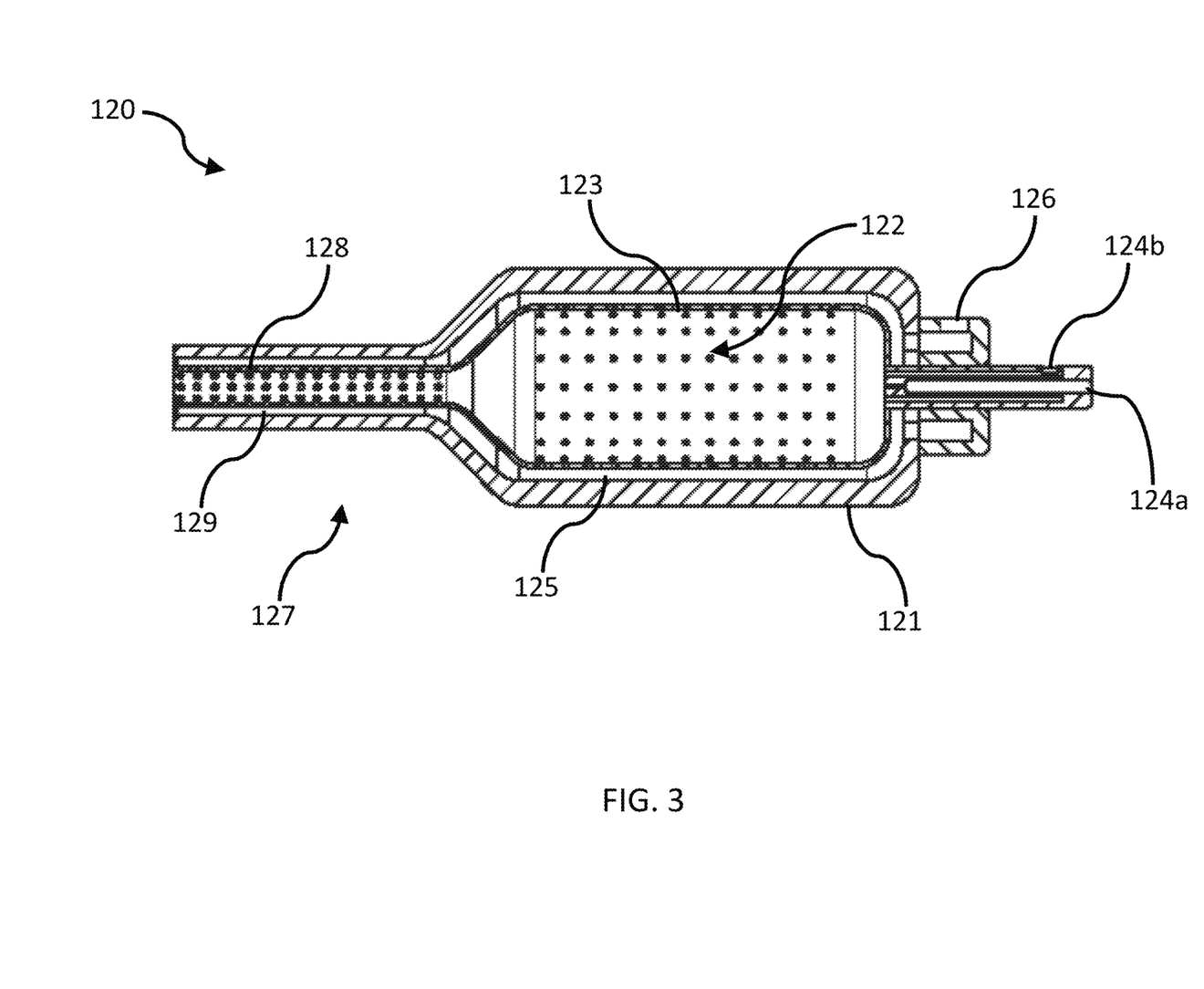
FIG. 3 illustrates a cross-sectional view of an example hydrothermal jet suitable for use in association with disclosed hydrothermal treatment reactors and/or disclosed hydrothermal treatment reactor systems.

Referring to FIG. 3, an example hydrothermal jet 120 may further include a permeable jet liner 123 separating the hydrothermal jet into a combustion zone 122 and a cooling annulus 125 internal to a jet casing 121. Combustion zone 122 may be located external to pressure vessel outer wall 112 and vessel permeable liner 113 (FIG. 2). By combusting the auxiliary fuel in a hydrothermal jet 120, radiant heat transfer from combustion zone 122 into reaction zone 114 may be reduced. Combustion zone 122 may incorporate a packed bed feature containing, for example, ceramic or metallic beads or a honeycomb matrix of metallic or ceramic composition. Such construction may facilitate ignition and stabilization of combustion of incoming auxiliary fuel, carrier and oxidizer mixtures. Further, the packed bed or honeycomb may be coated with a catalyst to further support combustion.

A permeable extension tube 128 extends from permeable jet liner 123 and separates a jet nozzle 127 of hydrothermal jet 120 and into a nozzle interior and a nozzle cooling annulus 129 surrounded by jet casing 121. Permeable jet liner 123 and permeable extension tube 128 are permeable to supercritical carrier and oxidizer supplied to cooling annulus 125 and nozzle cooling annulus 129, respectively. Before exiting the outlet of jet 120, the mixture of carrier and oxidizer in cooling annulus 125 is fully mixed with hot exhaust from combustion zone 122 to thereby controllably cool the jet to a desired exit temperature before entering liner 113.

Each hydrothermal jet 120 may further include an igniter such as a glow plug (not shown) configured to ignite auxiliary fuel and oxidizer in the at least one hydrothermal jet. Alternatively or additionally, the mixture may ignite spontaneously upon introduction of sufficiently hot supercritical steam.

The at least one hydrothermal jet 120 may include individually controllable inputs to combustion zone 122 for each of the supply of at least one auxiliary fuel, the supply of at least one oxidizer and the supply of at least one carrier so that the mixture may be selectively varied.

The one or more hydrothermal jets 120 may be mounted at any of a variety of locations and/or orientations on pressure vessel 111 suitable for preheating internal reaction zone 114. In an example, a hydrothermal jet 120 is mounted at the superior end of pressure vessel 111. In another example, a hydrothermal jet 120 is mounted remote from feed port 119a. In another example, a hydrothermal jet 120 is oriented at an angle with respect to feed port 119a. In another example, a hydrothermal jet 120 is oriented at an angle of approximately 90 degrees with respect to feed port 119a. In an example, hydrothermal jets 120 may be mounted with clamp-type connectors (not shown) such as those manufactured by Reflange or Grayloc.

When a number of hydrothermal jets 120 are provided, they may be arranged in stages along a length of reaction zone 114 and/or pressure vessel 111 and/or at a plurality of distances from feed port 119a and/or superior end of the pressure vessel. With each stage of hydrothermal jet 120 being configured for independent control of added auxiliary fuel, heat and required oxidizer, hydrothermal jets may be configured to selectively vary the addition of heated mixture of carrier and oxidizer to internal reaction zone 114 with distance from feed port 119a. This arrangement promotes axial spatial dispersion of oxidizer, carrier and auxiliary fuel into reaction zone 114 so that excessively high reaction rates and heat release rates can be reduced or avoided in order to maintain permeable liner 113 wetness.

Additionally, alternatively, a number of hydrothermal jets 120 per stage may be arranged around a perimeter or circumference of reaction zone 114 which may similarly promote distribution of oxidizer, carrier and auxiliary fuel to avoid excessive local heat release rates within liner permeable 113.

Pressure vessel 111, permeable liner 113 and at least one hydrothermal jet 120 are configured to cooperate to support reaction of the feed stream with the carrier and the oxidizer at elevated pressures within the supercritical and subcritical pressure range and at reaction temperatures significantly higher than safely achievable with tubular-type reactors. For example, the reaction may occur between about 100 and about 5000 psi and between about 600 and about 1800 degrees F.

Returning to FIG. 1, a means 162 for compressing the oxidizer is configured to compress the oxidizer to a pressure exceeding the hydrothermal jet operating pressure. In an example, compressing means 162 is an air compressor having a motor 163 and configured to receive air, filtered air or other oxidizer through an oxidizer inlet 161. The compressor may be cooled using an interstage cooler 164 fed carrier from supply 171. An oxidizer heating means 165 is configured to add heat to the supply of the at least one oxidizer upstream of pressure vessel 111 and/or the associated hydrothermal jet(s).

One or more heating means may be configured to heat the oxidizer before injection into a hydrothermal jet 120. In an example, means 165 for heating the oxidizer includes a heat exchanger configured to preheat the compressed air with hot liquid phase effluent from 2-phase separator 131. In another example, oxidizer heating means is a start-up heater 166 configured to heat the oxidizer feed. As system temperature comes up, for example, to operating temperature, oxidizer start-up heating means 166 may be gradually turned off.

A feed pump 172 or other means for compressing the carrier receives liquid phase of the carrier from a supply 171 and pumps it to heating means 173 and/or 179. Feed pump 172 may be configured to compress the carrier to a pressure exceeding the critical pressure thereof.

Carrier heating means 173 and/or 179 are configured to add heat to the supply of the at least one carrier upstream of pressure vessel 111 and/or the associated hydrothermal jet(s). In an example, carrier heating means 173 includes a heat exchanger configured to preheat the carrier with the liquid phase of effluent from 2-phase separator 131. In another example, carrier heating means is a start-up heater 179 configured to heat the carrier. As system temperature comes up, for example, to operating temperature, carrier start-up heating means 179 may be gradually turned off. A fired or electric heater 174 preheats the carrier to supercritical temperature. Heater 174 may always be operated at supercritical pressure and temperature. Effluent from heater 174 is maintained at supercritical temperature and pressure conditions during reactor operation including when pressure vessel 111 is operating at subcritical pressures.

Heater 174 may be of a "once through" design, a Benson boiler design or other known supercritical steam generator design. Because carrier is supplied to heater 174 at supercritical pressure, it is not necessary to have an evaporation section normally needed for steam generators operating at subcritical pressure. Preheating the carrier in preheater 173 at supercritical pressure also allows efficient heat recovery from hot effluent while avoiding creation of a 2-phase vapor/liquid stream during preheating. The carrier remains in a single-phase fluid during preheating in preheater 173.

Figure 4:
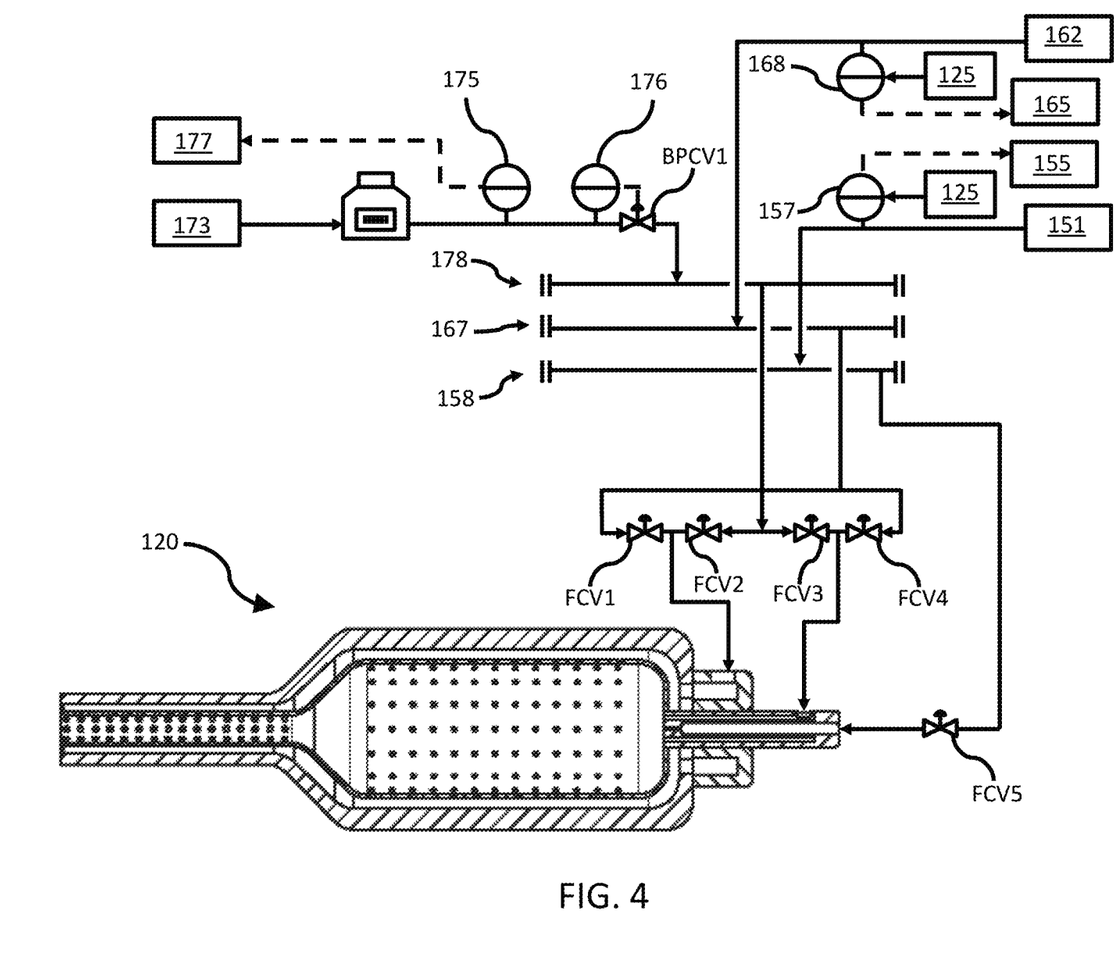
FIG. 4 schematically illustrates an example control arrangement suitable for use in association with disclosed hydrothermal jets.

FIG. 4 schematically illustrates an example control arrangement suitable for use in association with disclosed hydrothermal jets 120. Controller 175 is configured to maintain a constant supercritical pressure in carrier header 178 at all times, including during reactor operation at subcritical pressure. In an example, the setpoint is 3500 psi. Controller 176 adjustably closes a backpressure control valve BCV1 if, for any reason, carrier pressure drops below a pre-established setpoint to protect against operating the carrier generator at subcritical pressure. In an example, the setpoint of controller 175 may be 3500 psi if the carrier is water, while the setpoint of controller 176 may be 3300 psi, which is above the critical pressure of water. Back-pressure control valve BCV1 prevents pressure in the generator from dropping below the critical pressure of the carrier. BCV1 is full open during normal operations as controller 175 commands feed pump 172 to deliver sufficient flow to keep the pressure above the setpoint of the controller controlling BPCV. Capacity controller 177 adjusts the amount of steam being put into the hydrothermal jets to maintain 3500 psi.

Apart from the carrier stream, the system may be started up at low pressure prior to injection of target reactant feed. Carrier, oxidant and auxiliary fuel are sequentially and gradually fed to the hydrothermal jets to slowly bring the system up to the desired operating temperature. After temperatures are up to the desired system operating temperatures, system pressure can slowly be brought up to the desired reactor pressure by gradually increasing the set point of the back pressure controller. This allows system components to thermally stabilize at low pressure, thereby minimizing potential adverse effects of differential thermal expansion, differential thermal stresses, and low-cycle thermal fatigue. If any system leaks are discovered, say, at system mechanical joints, these are more safely and quickly addressed at low pressure.

Fuel pump discharge pressure is controlled by a differential pressure controller 158 at sufficient pressure for auxiliary fuel atomization by the injector. In an example, differential pressure controller 157 maintains auxiliary fuel pump discharge pressure at or above 500 psi differential with respect to the pressure in the hydrothermal jet combustion zone 122.

Air compressor discharge pressure is controlled by differential pressure controller 168 at sufficient pressure to overcome aerodynamic resistance downstream of the flow control valve under all conditions. In an example, differential pressure controller 168 maintains air pump discharge pressure at or above 500 psid.

Flow control valve FCV5 is configured to control flow of fuel from fuel header 158 to fuel inlet 124a (FIG. 3) of hydrothermal jet combustor 122. Flow control valve FCV4 is configured to control flow of air from air header 167 to the transverse air inlet 124b of hydrothermal jet combustor 122. Flow control valves FCV2 and FCV3 are configured to control flow of supercritical carrier from carrier header 178 to port 124b of hydrothermal jet combustor 122 and port 126 of hydrothermal jet 120, respectively. Flow control valve FCV1 is configured to control flow of preheated, compressed air from air header 167 to port 126 of hydrothermal jet 120.

Each flow control valve is controlled by a central process control system. FCV4 and FCV5 are controlled to maintain the proper fuel/air ration to hydrothermal jet 120. FCV1 is controlled to supply sufficient air to fully oxidize any organic or other oxidizable compounds in the target reactant inside reaction zone 114. FCV3 is controlled to ignite and moderate the combustion of the mixture of auxiliary fuel and air. FCV2 is controlled to provide carrier for mixing with and cooling hot exhaust from jet combustion chamber 122 and to cool jet liner 123. The central process control system coordinates the action of these five flow control valves to maintain a desired temperature range at the outlet of liner 113 in vessel 111 by a suitable control algorithm. In an example, flow control valves may be equipped with or otherwise include precision servo-actuators.

The process control system may incorporate artificial intelligence capability to allow "training" of the control system to adapt to changes, for example, in target reactant feed rate, variations in feed organic content, variations in liner 113 exhaust temperature and other variables to maintain stable operation while also achieving optimal reaction efficiency and system thermal efficiency. The process control system may also provide data logging and self-diagnostic capabilities to assist troubleshooting and system maintenance. The process control system may incorporate an array of process sensors to detect fault conditions and initiate the system shutdown sequence, if appropriate.

Returning again to FIG. 1, an effluent separator or 2-phase separator 131 is coupled with exhaust funnel 117 and configured to collect hot liquid, vapor and solid phases of the by-products and/or effluent and separate the vapor from the combined liquid and solid phases. The temperature in the separator is maintained at a suitable margin below the saturation temperature of the liquid phase. The temperature in separator 131 is controlled by the controlled injection of cooled, recirculated liquid phase from separator 131. The recirculated liquid phase is cooled by means of a heat exchanger 134. The heat exchanger 134 may be integrated with an organic Rankine cycle (ORC), Kalina cycle, or other such thermal power recovery means known in the art. At supercritical operating pressure of 3500 psig, the density ratio between the vapor and liquid phases in separator 131 may be 4.4:1 while at 1300 psig operating pressure, the density ratio may be 15.25:1 suggesting that liquid-vapor separation may be more readily accomplished at subcritical reactor operating pressure.

A gas expansion engine 132 is configured to receive the hot vapor phase of the by-products and/or effluent and output rotation to a generator 133 and power therefrom. In an example, expansion engine 132 is a rotary expansion engine. In another example, expansion engine 132 is a positive displacement expansion engine. A pressure reduction valve may be located upstream of the inlet of expansion engine 132 to avoid overpressure thereof. The reactor system 100 may further include a heat source (not shown) configured to add heat to the hot, vapor-phase reaction by-products and/or effluent upstream of the expansion engine. In an example, the heat source is an externally fired heater. In another example, the heat source is one or more hydrothermal jets. BCV2 enables adjusting reaction pressure to selectively operate either above or below the critical pressure of water.

A main feed pump 141 is configured to pump target reactant from the supply to pressure vessel feed port 119a after passing through heating means 142 and 143. In an example, feed heating means 142 is a heat exchanger configured to preheat the target reactant stream with hot liquid phase effluent from 2-phase separator 131. In another example, feed heating means 143 is a start-up heater 143 configured to heat the target reactant feed during system start-up. As system temperature comes up, for example, to operating temperature, start-up heater 143 may be gradually turned off.

An auxiliary fuel pump 151 is configured to pump auxiliary fuel from the supply to hydrothermal jets 120.

Reactor system 100 may alternatively include a heat exchanger 134 configured to remove heat from the hot liquid phase of effluent after any preheating of the at least one feed, the oxidizer, the carrier or a combination thereof. In this alternative configuration, the removed process heat may be transferred to the environment, or alternatively to provide heat for another useful non-power recovery purpose, eg. municipal district heating.

Reactor system 100 may further include, a thermal cogeneration system 181 configured to receive heat from the liquid phase of effluent after preheating of at least one fuel, the oxidizer, the carrier or the combination thereof. Heat rejected from heat exchanger 134 may be used to power an organic Rankine, Kalina or other bottoming cycle, transferred an external application such as municipal district heating or rejected to the environment by an air-cooled heat exchanger or cooling tower.

For example, an organic Rankine cycle power recovery module or unit may be provided to convert additional heat to mechanical power at generator 133. The organic Rankine cycle power recovery unit may operate as a simple organic Rankine cycle or a recuperative organic Rankine cycle. The recirculating liquid stream from separator 131, after preheating the reactor feed streams in heat exchangers 173, 165 and 142, still retains considerable recoverable heat energy. Reactor system 100 may achieve a thermal efficiency for power generation of about 30% without power recovery from heat exchanger 134. A thermal efficiency of about 40% can be achieved by replacing heat exchanger 134 with a simple organic Rankine cycle. A thermal efficiency of about 50% (or higher) can be achieved with a recuperative organic Rankine cycle. Alternatively, a Kalina cycle may be used instead of an organic Rankine cycle. The system user may select a bottoming cycle of any design to recover the heat energy from exchanger 134. Use of a recuperative organic Rankine bottoming cycle is estimated to double the total system power output versus the power output from an expansion engine alone. By incorporating such a bottoming cycle, thermal efficiencies remain fairly constant, even with operation at subcritical pressures down to as low as 1000 psig (or lower) reactor operating pressure.

Excess liquid is removed from the system by way of a level control valve LCV. Additionally or alternatively, free solids may be removed using gravity settling. Liquid level control valve LCV is controlled by LIC 197 to maintain a constant liquid level and pH in separator 131 by blowing down excess liquid accumulating therein. A recirculation pump 135 is configured to pump the remaining cooled, liquid phase by-products and/or effluent from heat exchanger 134 back to the quench cooler of vessel 111 for quench cooling of hot reactor effluent exiting liner 113. A treatment pump 134 may add one or more treatments to the effluent recirculation stream before injection to the reactor exhaust zone near exhaust funnel 117.

A solid separation means 137 may be provided for removing any free solids from the liquid phase of the by-products and/or effluent from the separator 131. Any free solids recovered by the solid separator 137 are drained at a suitable interval solid control valve SCV.

Figure 5:
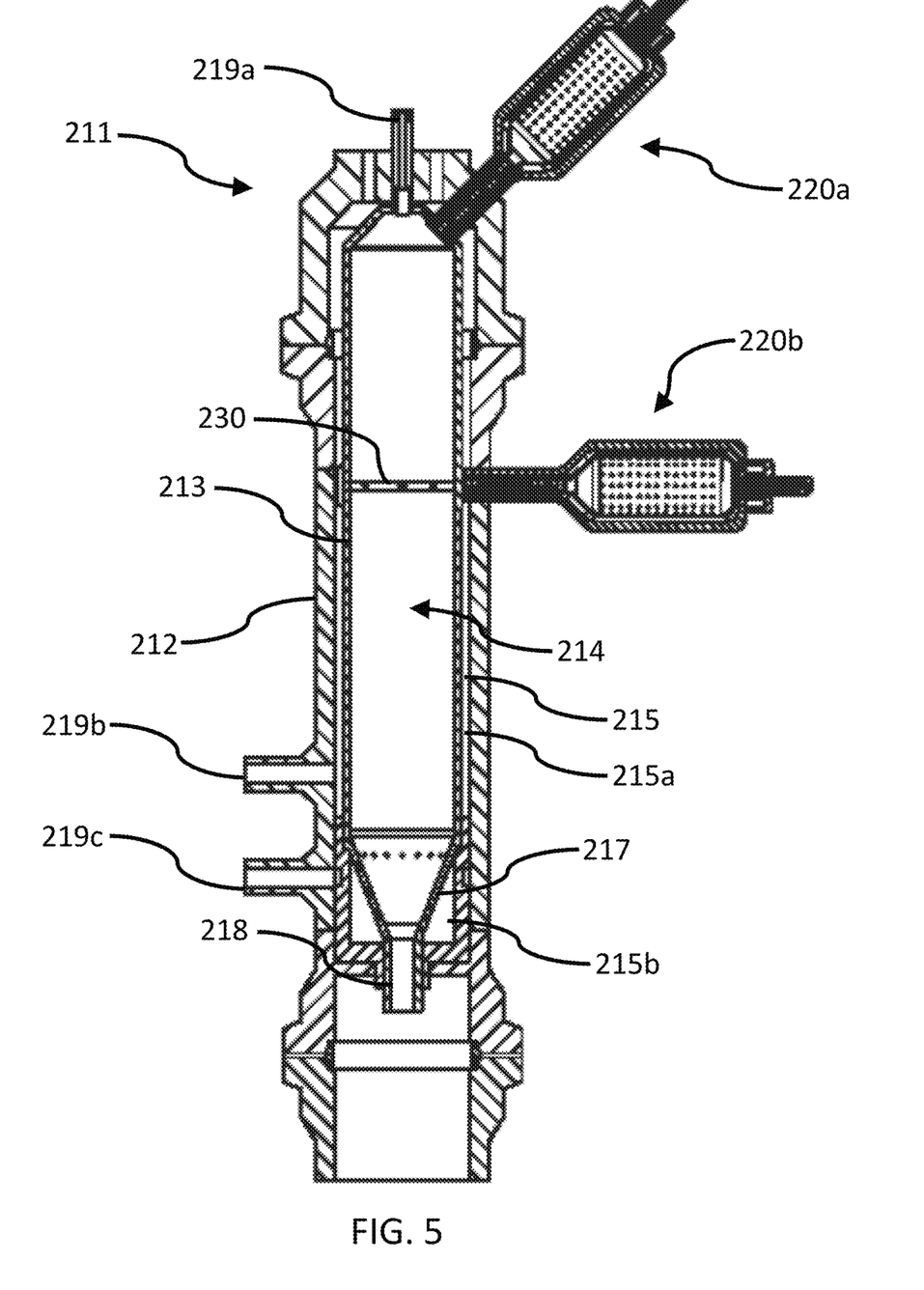
FIG. 5 illustrates a cross-sectional view of another example hydrothermal treatment pressure vessel suitable for use in association with disclosed hydrothermal treatment systems.

FIG. 5 illustrates a cross-sectional view of another example hydrothermal treatment pressure vessel 211 suitable for use in association with disclosed hydrothermal treatment reactor systems. Components of pressure vessel 211 are generally equivalent to like components of pressure vessel 111 unless otherwise specified. Pressure vessel 211 includes a vessel outer wall 212 and a liner 213 dividing inner spaces of the pressure vessel. Pressure vessel 211 may be constructed from any of a variety of materials exhibiting corrosion-resistance and high-strength at high temperatures. Pressure vessel 211 may take any of a variety of shapes.

Liner 213 is disposed within pressure vessel 211 and separates the pressure vessel into an internal reaction zone 214, where the target reactant feed and oxidizer react, and an outer annular space or chamber 215 configured for filling with a carrier and/or oxidizer cooler than liner 213. Any of a variety of corrosion resistant materials may be suitable for the construction of liner 213. A dividing wall 216 portions outer, annular chamber 215 into upper 215a and lower 215b cooling chambers. An exhaust funnel 217 is provided within lower cooling chamber 215b to collect and direct exhaust, reaction by-products and/or effluent from reaction zone 214.

Coupled with the supply of target reactant, reactor feed port 219a penetrates pressure vessel 211 and is configured for feeding a target reactant stream thereto, for example, at a superior end of pressure vessel 211. A vapor outlet or vent 218 may penetrate pressure vessel outer wall 212 at a top or superior of annular chamber 215 to vent accumulated vapor therefrom. Transpirational carrier feed port 219b is configured to deliver carrier to upper annular chamber 215a while quench cooling feed port 219c is configured to deliver cooled liquid effluent to lower annular chamber 215b for cooling of exhaust funnel 217.

A number of hydrothermal jets 220a and 220b are mounted to pressure vessel 211. In an example, a hydrothermal jet 220a is mounted at the superior end of pressure vessel 211 and a hydrothermal jet 220b is mounted remote from feed port 219a. Each hydrothermal jet 220 may be oriented at an angle with respect to feed port 219a. In an example, a hydrothermal jet is oriented at an angle of approximately 45 degrees with respect to the feed port. In another example, a hydrothermal jet is oriented at an angle of approximately 90 degrees with respect to the feed port. While only a two hydrothermal jets are depicted in FIG. 5, any suitable number of hydrothermal jets may be included for supporting reactions in reaction zone 214.

As an alternative to a number of hydrothermal jets arranged around a perimeter or reaction zone circumference of the (not shown), the reactor system and/or pressure vessel 211 may include a circumferential or perimetric distribution manifold 230 inserted into liner assembly 113 and configured to inject heat and required oxidizer from a single hydrothermal jet 220b at multiple discrete locations circumferentially or perimetrically around the reaction zone 214.

Components of reactor system 100 may be coupled, controlled or bypassed by any of a variety of known plumbing, valving and metering apparatus. Also, a wide variety of pressure differential detectors and pressure and/or temperature sensors may be provided for supplying useful information about reactor system 100, critical points throughout the system and/or conditions thereof for use by monitoring, control, safety and/or alarm apparatus. Further, pressure vessels 111 and/or 211 and internal components such as permeable liners 113 and/or 213 and/or hydrothermal jets 120, 220a and 220b may be suitable for use in a variety of reactor systems. Similarly, external components of reactor system 100 and disclosed arrangements thereof may be suitable for use with a variety of pressure vessels and/or reactors such as those excluding permeable liners or those including liners which are not permeable and/or do not support transpiration cooling.

While system 100 and other disclosed systems may benefit from arrangements of feed pump 172, heat exchanger 173, start-up heater 179, flow control valve FCV2, flow control valve FCV3 and/or transpirational carrier feed port 119b that are suitable for operation at supercritical pressures, capital cost savings may be achieved by constructing some components for sub-critical operation.

Disclosed reactors, pressure vessels, reactor systems, hydrothermal jets and other components may be suitable for use in any of a variety of oxidation processes, hydrothermal treatments and/or waste-eliminating processes.

Considering FIG. 1, an example process of target reactant elimination includes providing a supply of target reactant, a supply of at least one auxiliary fuel, a supply of at least one oxidant or oxidizer, a supply of at least one carrier and a pressure vessel 111 with a permeable liner disposed therein and reacting the oxidizer and supply of target reactant in the pressure vessel.

Pressure vessel 111 is configured for operation at temperatures and pressures in excess of the critical temperature and pressure of water while the permeable liner separates the pressure vessel into an internal reaction zone and an outer annular chamber.

A feed of target reactant from the supply mixed with, for example, water is pumped by feed pump 141 into pressure vessel 111 at a reactor feed port at a first location in the pressure vessel outer wall. The target reactant feed is delivered to the internal reaction zone within the permeable liner. The target reactant feed may include per- and polyfluoroalkyl substances (PFAS), Perfluorooctanesulfonic acid (PFOS) and related compounds both with and without carbon including but not limited to organofluorides. In an example, the target reactant elements may comprise less than 5% of the feed. The feed may be preheated by heat exchanger 142 and, if desirable, in series with a start-up heater for system start-up only.

The process may further include supplying a flow of the at least one carrier and/or water between the vessel wall and permeable liner 113 for transpiration cooling thereof. Many target reactant feeds contain halogen compounds and/or inorganic solids. These halogen compounds can form acid gases as reaction byproducts. Inorganic solids often pass as unoxidized particles through liner 113. To flush an impinging acid gases or solids of the inner wall of liner 113, hot transpiration water is supplied from downstream of heat exchanger 173. This transpiration water may optionally be dosed by a metering pump with a suitable neutralizing agent to control corrosive acid attack of the inner wall of liner 113 or dosed with a suitable cleaning agent to remove accumulated solids. The target reactant feed is oxidized in the internal reaction zone while carrier flows around and through the permeable liner.

Auxiliary fuel is pumped by an auxiliary fuel pump 151 from a supply to one or more hydrothermal jets 120 penetrating from outside the pressure vessel outer wall through an injector and into an internal reaction zone inside the permeable liner. Oxidizer is received by a compressor 162 from an oxidizer inlet 161 and pressurized for input to one or more hydrothermal jets 120. The oxidizer may be heated by a heat exchanger 165 which is heated by hot liquid phase reactor effluent and/or an electric or fired start-up heater. A carrier is pumped to the number of hydrothermal jets by a boiler feed pump 172. The carrier may also be heated by a heat exchanger 173 which is heated by hot liquid phase reactor effluent and/or an electric or fired start-up heater 179.

The auxiliary fuel, carrier and oxidizer are mixed and heated and/or ignited within a combustion zone 122 of each hydrothermal jet 120. The hot combustion byproducts from combustion chamber 122 are subsequently mixed together in nozzle 127 with the carrier/oxidizer mixture in annulus 125 thereby controllably cooling the hot combustion byproducts to the desired jet outlet temperature. The combined hot, oxidizer-rich mixtures are then directionally exhausted into the internal reaction zone 114. Alternatively, the effluent from a hydrothermal jet 120 may be distributed circumferentially around or axially along liner 113 by means of a suitable distribution manifold incorporated into liner assembly 113.

An heated mixture of hot carrier and oxidizer from the supplies of carrier and oxidizer are injected into internal reaction zone 114 at a location distinct from feed port 119a to thereby promote mixing, feed vaporization and to provide activation energy to a reaction between the oxidizer and the target constituents in the feed. Thus, the internal reaction zone is preheated by exhausting the hot, oxidizer-rich effluent from hydrothermal jets 120 into internal reaction zone 114. The temperature and quantity of hot carrier and hot oxidizer injected by the jets into the reaction zone 114 may be individually controlled to meet the requirements for complete oxidation of the target constituents in the target reactant feed.

The heated, oxidizer-rich mixture from hydrothermal jets 120 may be added at a number of locations, for example, at a number or variety of distances from the feed port. In an example, the addition of heated mixture of carrier and oxidizer to the internal reaction zone may be varied with distance from the feed port. The heated mixture may additionally or alternatively be added at a number of discrete locations arranged around a perimeter or circumference of the internal reaction zone 114. The number and location of hydrothermal jets 120 may be selected to enable "step-wise" oxidation of the target reactant feed thereby attenuating maximum reaction temperature within reaction zone 114. Such "step-wise" oxidation may also enable higher organic concentrations in the target reactant feed and avoid situations in which excessive local heat released inside reaction zone 114 causes a lack of "wetness" of liquid phase transpiration fluid at any location on the inner surface of liner 113.

The mixture of the target reactant and oxidizer and carrier is reacted within the internal reaction zone. Pressure vessel 111, the permeable liner and the at least one hydrothermal jet 120 cooperate to promote reacting the feed stream with the carrier and the oxidizer at pressures between about 80 and about 5000 psi and at temperatures between about 600° and about 1550° F.

Hot, liquid-phase effluent is sent from 2-phase gas-liquid separator 131 to heat exchangers 142, 165 and/or 173 for preheating the carrier output from the supercritical water generator feed pump 172, for preheating the oxidizer supply and for preheating the target reactant feed. Cooled recirculated liquid effluent from 131, via heat exchangers 142, 165, 173 and 134, is thereby injected into lower chamber 115b and permeable exhaust funnel 117 for quench cooling the hot reaction products exiting the bottom of zone 114 and flushing any remaining free solids into separator 131 for phase separation. Cooled liquid effluent may be dosed with a suitable agent to neutralize any acids, or otherwise beneficially treat the reactor effluent.

Hot, pressurized non-condensable reaction by-products and water vapor are sent from 2-phase separator 131 to an expansion engine 132 for driving a generator 133 thereby generating electrical power output.

Vapor accumulated in the top of the annular chamber in pressure vessel 111 is vented through an outlet to 2-phase separator 131, for example, with a flow control orifice.

Eventually, liquid carrier is pumped back for use in quench cooling of reaction exhaust at pressure vessel 111. A treatment pump 136 may inject a chemical agent such as sodium hydroxide to the cooled stream of liquid-phase effluent before injection to the pressure vessel exhaust chamber and/or nozzle. Sodium hydroxide is an effective neutralizing agent for any acids in the liquid effluent from exhaust funnel 117. Inorganic, solid effluent is separated from the effluent with a solid separator 137.

Embodiments of the disclosure are susceptible to being used for various purposes, including, though not limited to, enabling users to burn fossil fuels, particularly natural gasses, with high efficiency and thoroughly and safely eliminate or neutralize hazardous target reactant. Energy efficient features of the disclosure including exhaust funnel 117, 2-phase separator 131, feed preheaters 142, 165 and 173, expansion engine 132 and organic Rankine cycle or Kalina cycle power recovery system 181 may be applied to hydrothermal oxidation reactors or hydrothermal gasification reactors of designs different from the transpiring-wall design.

Modifications to embodiments of the disclosure described in the foregoing are possible without departing from the scope of the disclosure as defined by the accompanying claims. Expressions such as "including", "comprising", "incorporating", "consisting of", "have", "is" used to describe and claim the disclosure are intended to be construed in a non-exclusive manner, namely allowing for items, components or elements not explicitly described also to be present. Reference to the singular is also to be construed to relate to the plural.

What is claimed is:

1. A hydrothermal reactor system comprising:
a pressure vessel having a vessel wall;
at a superior end of the pressure vessel, a feed port configured for feeding a liquid target reactant stream into the pressure vessel;
a permeable liner disposed within the pressure vessel separating the pressure vessel into an internal reaction zone and an outer annular chamber;
a dividing wall portioning the outer annular chamber into a cooling zone and an exhaust zone through which by-products of the reaction exit from the reaction zone; and
mounted to the pressure vessel external to the reaction zone, at least one hydrothermal jet having a permeable jet liner separating the hydrothermal jet into a combustion zone and a cooling annulus.

2. The hydrothermal reactor system as set forth in claim 1, wherein the hydrothermal jet is configured to vaporize the liquid target reactant by adding a heated mixture of carrier and oxidizer to the internal reaction zone.

3. The hydrothermal reactor system as set forth in claim 2, wherein the hydrothermal jet is configured to add the mixture of carrier and oxidizer at a velocity adequate to penetrate the internal reaction zone.

4. The hydrothermal reactor system as set forth in claim 1, wherein the at least one hydrothermal jet is mounted at the superior end of the pressure vessel.

5. The hydrothermal reactor system as set forth in claim 1, wherein the at least one hydrothermal jet further comprises a plurality of hydrothermal jets configured to selectively vary the addition of mixture of carrier and oxidizer to the internal reaction zone with distance from the feed port.

6. The hydrothermal reactor system as set forth in claim 1, wherein the at least one hydrothermal jet further comprises a combustion zone and individually controllable inputs to the combustion zone for each of a supply of at least one auxiliary fuel, a supply of at least one oxidizer and a supply of at least one carrier.

7. The hydrothermal reactor system as set forth in claim 1, wherein the at least one hydrothermal jet further comprises a combustion zone located external to the vessel wall and the permeable liner.

8. The hydrothermal reactor system as set forth in claim 1, further comprising a throttle control valve provided to an inlet of the at least one hydrothermal jet and configured to selectively adjust flow of the oxidizer and/or carrier provided from supplies thereof.

9. The hydrothermal reactor system as set forth in claim 1, further comprising a permeable extension tube extending from the permeable jet liner through a jet nozzle of the hydrothermal jet and to the internal reaction zone.

10. The hydrothermal reactor system as set forth in claim 1, further comprising a permeable extension tube extending from the permeable jet liner and separating a jet nozzle of the hydrothermal jet into a nozzle interior and a nozzle cooling annulus.

11. The hydrothermal reactor system as set forth in claim 1, further comprising, an advanced power recovery unit configured to harvest mechanical power from hot, liquid-phase effluent resulting from reacting of at least one oxidizer with target reactant in the internal reaction zone.

* * * * *